Patented Oct. 16, 1934

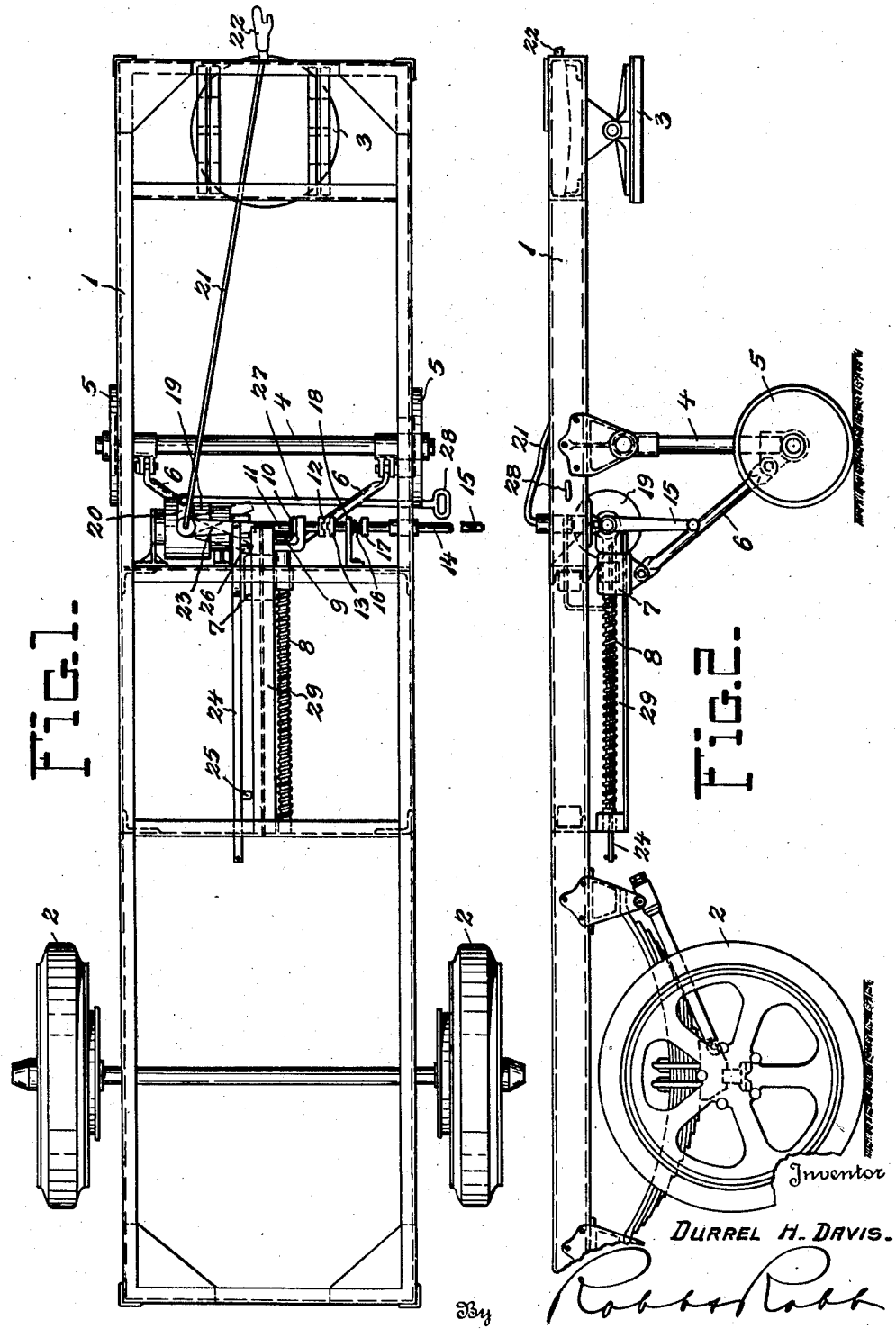

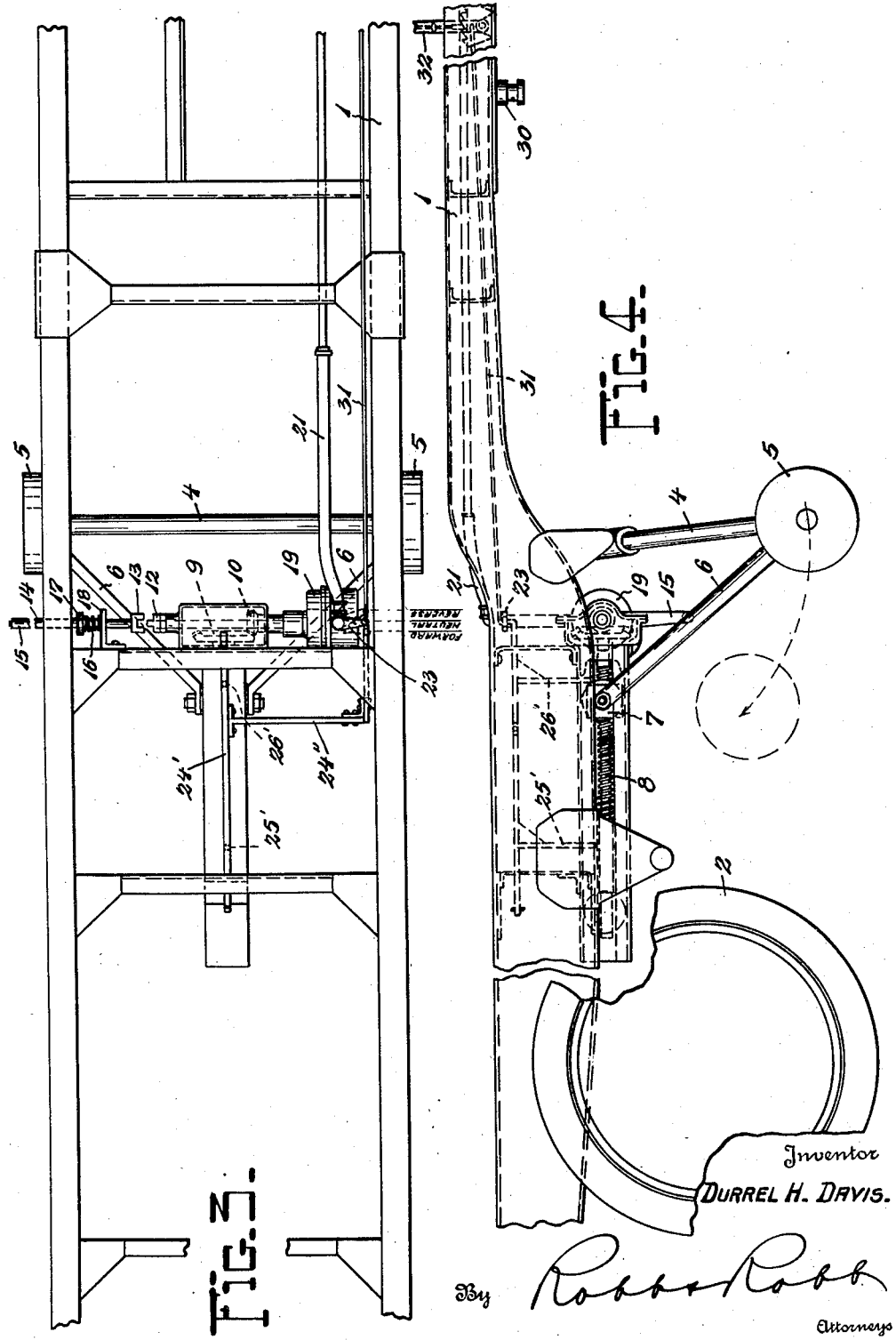

1,976,985

UNITED STATES PATENT OFFICE 1,976,985

FLUID OPERATED SCREW JACK

Durrel H. Davis, Edgerton, Wis., assignor to Highway Trailer Company, Edgerton, Wis., a corporation Application March 31, 1933, Serial No. 663,847

2 Claims. (Cl. 280—33.1)

In the art of tractor-trailer combination vehicles, it is customary to provide a four-wheel tractor vehicle unit and a two-wheel trailer vehicle unit. The two said units are hitched together, so to speak, by a fifth wheel connection well known in the art, which need not be described for the purposes of setting forth this invention.

When the trailer vehicle unit is to be uncoupled from the tractor vehicle, a temporary wheeled support, sometimes called a jack in the art, is caused to assume an operative position to support the front end of the trailer after it has been uncoupled, being adjusted to its supporting position before the uncoupling operation takes place to thus prevent the dropping of the front end of the vehicle in the self-evident manner.

In tractor-trailer vehicle combinations of today, air under pressure is used for the operation of the brakes of the trailer vehicle in many constructions now employed. Air under pressure being available, it is contemplated by the present invention to provide a special air motor on the trailer having an air line to supply air under pressure thereto for operation thereof, said air line being susceptible of being connected to the air line of the tractor when the tractor is coupled with the trailer. By the provision of the motor and suitable connecting gearing, the motor is designed so that it may drive the operating means for the support for the front end of the trailer, whereby to raise and lower said support by the application of fluid power. This invention comprehends specific instrumentalities for the above purpose combined with operating means for said support which are generally of the conventional type, and combined with automatic control devices such that when the trailer support is caused to reach its supporting position or its inoperative position, the action of the fluid power moving means therefor will be automatically discontinued.

With the above objects in view, and the additional object of obtaining as simple a construction of the said novel instrumentalities as practicable, the details of my invention will be fully understood from reference to the following description and accompanying drawings, in which—

Figure 1 is a plan view of a trailer showing the novel mechanism of the invention applied thereto.

Figure 2 is a side elevational view of the parts shown in Figure 1.

Figure 3 is a view similar to Figure 1, the ground wheel gear being omitted, and showing a modification of the invention.

Figure 4 is a side elevational view of the parts shown in Figure 3 and illustrating the rear ground wheels of the trailer.

In Figures 3 and 4 the trailer illustrated is of a somewhat different type from that illustrated in Figures 1 and 2.

In referring to the drawings, since the general type of trailer shown is well known to those versed in the art, it may be indicated as comprising the frame or chassis 1, the rear ground wheels 2, the upper fifth wheel 3 at the front end of the trailer, and the wheeled support 4 having the small wheels 5 and designed to carry the front end of the trailer when the said trailer is disconnected from the tractor. The support 4 is pivoted as usual and thus adapted to be lowered to the position shown in Figure 2 or raised so as to afford a clearance between its wheels 5 and the ground level when the support is out of use during the time the trailer is coupled to its tractor vehicle, the latter not shown. To raise and lower the support 4, some conventional means may be utilized such as the raising link 6 pivoted to the lower end of the support 4 and likewise pivoted to a slide 7 adapted to be operated by a screw shaft 8 after a manner well known to those versed in the art. The screw shaft 8 has a bevel gear 9 meshing with a similar gear 10 on an operating shaft 11. This shaft 11 has a clutch member 12 to cooperate with a mating clutch member 13 on a hand operated shaft 14. The shaft 14 has a crank handle 15 by which it may be rotated so as to manually turn the shaft 11 and screw 8 for actuation of the slide 7 to raise and lower the support 4 and its wheels 5 when this is desired to be done by manual effort. As illustrated in Figure 1, the clutch members 12 and 13 may be held normally disengaged by a spring 16 bearing against a collar 17 on the shaft 14 and interposed between said collar and a bracket 18 on the chassis or frame of the trailer.

The main objective of my invention, however, is to operate the support 4 by suitable fluid motor as considerable manual effort is required to actuate the support 4 in practice and the aim is to relieve the operator of the vehicle of the necessity of expending manual effort, as much as possible. To the above end I mount in operative relation to the shaft 11 at its extremity opposite that having the clutch member 12, a fluid motor 19, said fluid motor being of any conventional rotary type equipped with a supply and cut-off valve operable by the valve arm 20 in order to supply motive fluid to the motor 19 from the air line 21 which leads to a common form of air line connector designated 22.

The connector 22 is disposed in front of the forward end of the chassis or frame 1 so that it may be readily connected with a mating connector on a tractor at the rear end of a fluid pressure line such as those which tractors for trailers are equipped with today.

The operation of the fluid or air motor 19 is of course controlled by the valve, not shown, with which the valve arm 20 is connected. A second valve control arm 23 is attached to the said air valve along with the valve arm 20, and is a part of kick-off mechanism for moving the said valve to a neutral or cut-off position in which it discontinues the supply of the motive fluid to the motor 19. Leading from the secondary valve arm 23 and pivotally connected thereto is a kick-off slide 24 having the abutment lug 25 in the path of movement of the slide 7 that is actuated by the screw 8 and which is connected by the link 6 to the support 4. The kick-off slide 24 has another abutment member 26 at its end more adjacent to the motor 19 and likewise in the path of movement of the slide 7. Leading from the first valve arm 20 laterally through one side of the frame 1 is a handle rod or member 27, the handle of which is designated 28.

With the above construction in view, the operation of the mechanism may now be described. It will be borne in mind, as shown in Figure 1, that the supply and cut-off valve for the fluid motor 19 is adapted to assume three positions,—the neutral position in which the supply of air under pressure from the line 21 is cut off, and two positions assumed by movement in opposite directions from the neutral position in which the supply of air causes the motor to turn in one direction and to turn in an opposite direction. In Figure 1 the full line position of the secondary valve arm 23 is assumed when the cut-off valve is in the cut-off position. The left dotted line position of the arm 23 will cause the valve to assume a position so that the rotor of the motor 19 turns in one direction to raise the support 4. The right-hand dotted line position of the arm 23 causes the rotor of the motor 19 to turn in an opposite direction to reverse the movement of the support 4 and carry it to a supporting position.

Assuming that a tractor vehicle has been connected to the fifth wheel 3 of the trailer vehicle comprising the frame 1 and the air line connector 22 suitably coupled to its mating connector on the tractor,—it will be evident that the operator by pulling on the handle 28 can readily shift the valve arm 23 to its rightward position shown in dotted lines in Figure 1. This action will cause the motor 19 to rotate the shaft 11 and cause the screw 8 to move the actuating slide 7 to the left along the guide means 29 provided therefor. The movement of the slide 7 will raise the support 4 through the link means 6 and as the slide 7 approaches the left extremity of its movement it strikes the abutment 25 and shifts the kick-off slide 24 to the left until the said slide pulls the valve arm 23 to neutral or cut-off position, thus discontinuing the elevating movement of the support 4 which carries it to an inoperative adjustment with proper clearance between its wheels 5 and the ground. It will be assumed that the tractor has pulled the trailer to its destination and is ready to uncouple therefrom. Before uncoupling, the support 4 must be lowered. The operator will thereupon actuate the handle rod 27 to shift the valve arm 23 in a leftward direction, which causes the control valve to supply the fluid pressure to the motor 19 and reverse the operation of the shaft 11 from that previously described. The turning of the shaft 11 of course actuates the screw 8 again, and its slide 7, and this brings the support 4 down to its vertical position, shown in Figure 2. When the slide 7 reaches its forward limit of movement, it will have struck the abutment 26 and thus shifted the kick-off slide 4 to the right sufficiently to throw the valve arm 23 to its neutral or cut-off position.

If the pressure line 21 should not be operated for any reason, as for instance when the trailer is coupled to a tractor not equipped with fluid pressure mechanism, the support 4 may be raised and lowered by turning the crank shaft 14, upon moving said shaft 14 inward to engage the clutch parts 12 and 13.

Passing now to the construction of my invention illustrated in Figure 4, those parts of the trailer vehicle which are similar to, or equivalent in function to the parts described in Figures 1 and 2, are characterized by the same numbers as previously used, and therefore need not be described in detail again. It is simply noted that the trailer frame in Figures 3 and 4 is a somewhat different type of construction, being known as a drop frame, in the parlance of the art. Moreover, this trailer frame 1 of the modified form instead of carrying a fifth wheel 3 as previously described, is equipped with a king pin 30 for the usual coupling engagement with the lower fifth wheel customarily provided on many types of tractor vehicles today. In the modified embodiment of my invention there is employed the fluid motor type of drive for the actuation of the slide 7, as well as the manual shaft actuating means previously set forth, though these several instrumentalities are simply arranged in a little different manner as to their mountings on the trailer frame. The valve arm 23 for the motor 19 is located somewhat differently than previously described, and this necessitates the employment of a slightly different construction of kick-off slide 24' equipped with depending abutment arms 25' and 26' disposed in the path of movement of the slide 7 that cooperates with the actuating screw 8. The kick-off slide 24' has a lateral arm 24'' suitably connected to the valve arm 23, as seen in Figure 3 more clearly. In the modification of Figures 3 and 4,—instead of having the valve arm 23 operable by a handle rod 27 accessible from the side of the trailer, as previously described, I propose to employ a longitudinal manually actuated rod 31 which leads to the forward end of the trailer where there may be located a vertical hand lever 32 with which the rod 31 is connected, said hand lever 32 being accessible to be actuated readily by the operator sitting in the cab of the tractor, or the hand lever 32 may be operated in any other suitable and convenient manner. Thus, while sitting in the cab of the tractor or standing near the cab, the operator may move the lever 32 to control both the actuation of the slide 7 to raise the support 4, or the movement of said slide to lower said support. This will be done by the manual shifting of the valve arm 23 of the motor 19 as previously set forth, said valve arm being automatically moved to cut-off or neutral position by the kick-off mechanism in a manner self-evident from the foregoing description.

If desired, a supply tank or reservoir for a motive fluid may be mounted on the trailer, and the supply pipe line for supplying the motive fluid to the fluid motor may be connected with such reservoir. The reservoir is not illustrated as the foregoing is an obvious expedient.

It is further to be understood that I do not necessarily limit myself to the use of the specific actuating means for the support for the front end of the trailer as illustrated in my drawings, since other such actuating means might be employed for the purposes of the invention. Additionally, different types of fluid motors may be availed of, though the particular type useful for my invention is not illustrated in detail but in a general or diagrammatic manner.

Having thus described my invention, what I claim as new and desire to secure by Letters Patent of the United States, is—

1. In a trailer vehicle, in combination, a frame, a support for the front end of the frame, a slide on the frame, linkage connecting the slide with the support whereby movement of the slide in opposite directions will raise and lower the support, a fluid operated motor on the frame including a motor shaft, a screw shaft driven from the motor shaft, valve means for controlling the flow of fluid to the motor, a kick-off slide connected to said valve member, abutment means between the kick-off slide and the first mentioned slide that operates the support such that when the first slide reaches the limit of its movement in one direction the kick-off slide will be operated, and when the first slide reaches the limit of its movement in the opposite direction the said kick-off slide will be operated, thereby to operate the valve member to vary the flow of fluid to the motor, and manual means for manually controlling the operation of the valve.

2. The combination of parts set forth in claim 1, additionally combined with a manual operating shaft axially aligned with the motor shaft, clutch means normally inoperative but adapted to be connected for operatively connecting the manual operating shaft to the motor shaft, and handle means for turning the manually operated shaft when connected with the motor shaft so that the slide actuating means for the support may be operated manually when desired.

DURREL H. DAVIS.